(12) United States Patent  
Mosek et al.

(10) Patent No.: US 8,103,822 B2  
(45) Date of Patent: Jan. 24, 2012

(54) METHOD AND APPARATUS FOR IMPLEMENTING A CACHING POLICY FOR NON-VOLATILE MEMORY

(75) Inventors: Amir Mosek, Tel Aviv (IL); Menahem Lasser, Kochav Yair (IL); Mark Murin, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 450 days.

(21) Appl. No.: 12/430,089

(22) Filed: Apr. 26, 2009  
(Under 37 CFR 1.47)

(65) Prior Publication Data

US 2010/0274962 A1    Oct. 28, 2010

(51) Int. Cl.  
*G06G 12/08* (2006.01)

(52) U.S. Cl. .......... 711/103; 711/108; 711/118; 365/49; 365/185.08

(58) Field of Classification Search .................... 711/138  
See application file for complete search history.

(56) References Cited

U.S. PATENT DOCUMENTS

| | | | |
|---|---|---|---|
| 6,263,398 B1 * | 7/2001 | Taylor et al. | 711/3 |
| 6,496,905 B1 | 12/2002 | Yoshioka et al. | |
| 7,793,061 B1 * | 9/2010 | Gupta et al. | 711/162 |
| 2004/0117441 A1 | 6/2004 | Liu et al. | |
| 2004/0128470 A1 | 7/2004 | Hetzler et al. | |
| 2005/0066121 A1 | 3/2005 | Keeler | |
| 2005/0193025 A1 | 9/2005 | Mosek | |
| 2005/0256838 A1 | 11/2005 | Lasser | |
| 2007/0016725 A1 | 1/2007 | Chu et al. | |
| 2007/0106842 A1 | 5/2007 | Conley et al. | |
| 2007/0113000 A1 | 5/2007 | Murin et al. | |
| 2007/0276989 A1 | 11/2007 | Mosek et al. | |
| 2007/0276990 A1 | 11/2007 | Mosek et al. | |
| 2007/0283081 A1 | 12/2007 | Lasser | |
| 2008/0209109 A1 | 8/2008 | Lasser | |

* cited by examiner

*Primary Examiner* — Tan T. Nguyen  
(74) *Attorney, Agent, or Firm* — Martine Penilla Group, LLP

(57) ABSTRACT

The present disclosure relates to methods, devices and computer-readable medium for implementing a caching policy and/or a cache flushing policy in a peripheral non-volatile storage device operatively coupled to a host device. In some embodiments, data is stored to a cache area of a non-volatile memory within the peripheral non-volatile storage device in accordance with a historical rate at which other data was received by the peripheral storage device from the host device and/or a historical average time interval between successive host write requests received and/or an assessed rate at which data is required to be written to the non-volatile memory and/or a detecting by the peripheral non-volatile memory device that the host has read the storage ready/busy flag. In some embodiments, data is copied from a cache storage area of the non-volatile memory to a main storage area in accordance with the historical rate and/or the historical average time interval.

14 Claims, 14 Drawing Sheets

CASE 1

CASE 2

CASE 3

METHOD AND APPARATUS FOR IMPLEMENTING A CACHING POLICY FOR NON-VOLATILE MEMORY

FIELD OF THE INVENTION

The present invention relates to techniques and apparatus for implementing a caching policy for a non-volatile memory such as a flash memory.

BACKGROUND OF THE INVENTION

Multi-Level Cell (MLC) flash memory are useful for storing more than one bit of data on each memory cell. The writing of data into an MLC flash memory is typically slower than the writing of data into a Single-Level Cell (SLC) flash memory that stores only one bit of data per cell. Therefore, flash devices based on an MLC flash memory might not be capable of recording a stream of incoming data transmitted to it at a rate that exceeds the writing rate associated with the MLC flash memory.

Typically in cases where data is produced at a rate too high to be directly stored, a cache memory mechanism is provided and designed to operate fast enough to handle the incoming data stream. The cache memory utilizing a second (and faster) memory is implemented between the input data source and the main (and slower) memory of the flash memory device. The input data stream is first written into the faster cache memory, and at a later stage is copied from this faster cache memory into the main memory. As the copying operation between the cache memory and the main memory is typically performed in the background, this operation does not have to meet the strict performance conditions imposed by the input data stream rate, and therefore the lower write performance of the main memory is no longer an obstacle.

One type of flash memory device is a 'peripheral flash storage device" which is now discussed with reference to FIG. 1.

"Peripheral flash storage devices" 260 are well-known in the art of computing, in form factors such as USB flash drives (UFD); PC-cards; and small storage cards used with digital cameras, music players, handheld and palmtop computers, cellular telephones or any other form factor.

When coupled to a host device 310 (for example, a laptop or desktop computer or a mobile telephone), the peripheral flash storage devices 260 may receive user data via respective host side 350 and device side 250 interfaces (for example, a USB interface or an SD interface or an MMC interface or any other kind of wired or wireless interface). The received data may be written by flash controller 280 to flash memory 270 of the flash memory storage device.

Although host 310 and flash 260 devices are illustrated in FIG. 1 as separate devices, it is understood that in some embodiments, flash device 260 may be deployed within a housing of host device. Alternatively, flash device 260 may be deployed outside of a housing of host device.

As illustrated in FIG. 1, host device 310 sends data to flash memory storage device 260 (for example, associated with a write command). The data, which is received from the host, is written to volatile memory 282, for example by flash controller 280. Although volatile memory 282 is depicted in FIG. 1 as separate from flash controller 280, it is appreciated that, in some embodiments, volatile memory 282 (for example, RAM) may reside within and/or be a part of flash controller 280, After the data is written to volatile memory 282, it is copied to flash memory 270.

It is noted that when the host device 310 sends a write command to the flash device 260, there may be a need for the flash device 260 to write the data to flash memory 270 as soon as possible in. On the other hand, as noted above, sometimes other design considerations (e.g. the need to greater device capacity and/or reliability) may require that a "slower" writing mode that is slower than the fastest possible writing mode be used.

Towards this end, as illustrated in FIG. 2A, it is common in flash devices for flash memory 270 to include both a cache storage area 272 and a main storage area 274 for "longer term" storage. Incoming data may, at least some of the time, be written to the cache storage area 272 and, at a later time, be copied from cache storage area 272 to the main storage area 274.

In different implementations, the cache storage area 272 is written to using a 'faster writing mode' that is faster than a writing mode used for main storage area 274 and/or the main storage area 274 is larger (i.e. has a greater capacity) than the cache storage area 272.

In one particular example, cache storage area 272 includes flash blocks where K bits of data are stored in each flash cell where K is a positive integer, and the main storage area 274 includes flash blocks where L bits of data are stored in each flash cell where L is a positive integer that exceeds K.

FIG. 2B relates to a first use case. According to this use case, data is written to the cache storage area only.

In the example of FIG. 2C, which relates to a second use case (i) data is first written to the cache storage area 272; and (ii) at a later time, the data is copied from the cache storage area 272 to the main storage area 274.

The example of FIG. 2D, relating to a third use case, describes "cache bypassing." In this third use case, data is written directly to the main storage area 274 without first being written to the cache storage area 272.

FIG. 3 is a flow chart describing a technique for storing data to a flash memory 270. In step S211, the peripheral storage device 260 receives data from host device 310. In step S215, this data is stored in volatile memory (for example within flash controller 280 or at any other location within non-volatile memory device 260).

As illustrated in the use cases described with reference to FIGS. 2B-2D, the data is either (i) written to cache storage area 272 before being written (if written) to main storage area 274 (use cases 1 and 2)—i.e. the 'first flash writing' of the data is to cache 272 or (ii) is written to main storage area 274 without being written to cache storage area 272 (use case 3)—i.e. the 'first flash writing' of the data is to the main storage area 274.

For the former case (use cases 1 and 2), the 'yes' branch leaving step S219 is selected, and the data is written (in step S223) into the cache storage area 272. Optionally (see use case 2) and typically with a 'high frequency' or an 'extremely high frequency,' the data is copied (see the optionally line leaving the box of step S223) from the typically smaller cache storage area to the larger main storage area for longer-term storage. Copying the data allows the region within cache 272 in which the data was stored to be used to store new data For the latter case (use case 3) relating to 'bypassing' the cache, the data may be written directly to main storage area 274 (according to the 'no' branch leaving step S219) without writing the data first to the cache storage area Referring back to FIG. 1, it is noted that flash controller 280 may be implemented using any combination of hardware (for example, including a microprocessor and optionally volatile memory such as RAM or registers), firmware and/or code-modules (for example, stored in volatile and/or non-volatile memory and executable by a microprocessor). Flash controller 280 may include any software (i.e. tangibly stored in volatile and/or non-volatile memory) and/or firmware and/or hardware element(s) including but not limited to field programmable logic array (FPLA) element(s), field programmable gate array (FPGA) element(s), and application-specific integrated circuit (ASIC) element(s). Any instruction set architecture may be used in flash controller 280 including but not limited to reduced instruction set computer (RISC) element(s) and/or complex instruction set computer (CISC).

There is an ongoing need for method and apparatus for storing data to non-volatile memories including a cache storage area and a main storage area.

SUMMARY OF EMBODIMENTS

It is now disclosed for the first time a method of implementing a caching policy for a non-volatile storage device that has a non-volatile memory including a cache storage area and a main storage area, the method comprising: a) receiving data by the non-volatile storage device from a host device coupled to the non-volatile storage device; b) determining by the non-volatile storage device whether to write the received data to the cache storage area of the non-volatile memory before writing the received data to the main storage area of the non-volatile memory in accordance with at least one parameter selected from the group consisting of: i) a historical rate at which other data was received by the non-volatile storage device from the host device during a time period preceding the receiving of the data of step (a); and ii) an average time interval between successive host write requests received during the preceding time period; and c) in the event of a positive determining, writing the data received in step (a) to the cache storage area as determined.

In some embodiments, the at least one parameter includes the historical rate at which the other data was received.

In some embodiments, the determining to write the received data to the cache storage area of the non-volatile memory before writing the data to the main storage area is contingent upon the historical rate being above a threshold level.

In some embodiments, the at least one parameter includes the average time interval between successive host write requests.

In some embodiments, the data-receiving is carried out before the determining.

In some embodiments, the determining is carried out before the data-receiving.

It is now disclosed for the first time a method of implementing a caching policy for a non-volatile storage device that has a non-volatile memory including a cache storage area and a main storage area, the method comprising: a) receiving at least one request by the non-volatile storage device from a host device coupled to the non-volatile storage device to store data in the non-volatile memory; b) assessing a rate at which data is required to be written to the non-volatile memory in order to fulfill the at least one data storage request; c) in accordance with the assessed data-writing rate, determining whether to write the received data to the cache storage area of the non-volatile memory before writing the received data to the main storage area of the non-volatile memory; and d) in the event of a positive determining, writing the received data to the cache area as determined.

In some embodiments, the receiving of the at least one request includes receiving a first request and a second request; i) the rate assessing is carried out in accordance with: (A) respective amounts of data of the first and second requests; and B) a time difference between a time of receiving the first request and a time of receiving the second request.

In some embodiments, i) the receiving of the at least one request includes receiving a first request and a second request; ii) the rate assessing is carried out in accordance with a quotient between: A) the total amount of data of the first and second requests; and B) a time difference between a time of receiving the first request and a time of receiving the second request.

It is now disclosed for the first time a method of implementing a caching policy for a non-volatile storage device that has a non-volatile memory including a cache storage area and a main storage area, the method comprising: a) receiving a request by the non-volatile storage device from a host device coupled to the non-volatile storage device to store data in the non-volatile memory; b) if the non-volatile storage device is in a store-to-cache-first mode at a time that the request is received, write the received data to the cache storage area of the non-volatile memory before writing the received data to the main storage area of the non-volatile memory; c) if the non-volatile storage device is in a bypass-cache mode at a time that the request is received, write the received data to the main storage area of the non-volatile memory without writing the received data to the cache storage area of the non-volatile memory; and d) effecting a mode transition, by the storage device, from the bypass-cache mode to the store-to-cache-first mode in response to a detected reading, by the host, of a storage ready/busy flag that returned a busy status.

In some embodiments, the method further comprises: e) in accordance with a fullness of the cache storage area, deciding whether or not to transition from the store-to-cache-first mode to the bypass-cache mode; and f) effecting the transition from the store-to-cache-first mode to the bypass-cache mode as determined.

It is now disclosed for the first time a method of implementing a cache flushing policy for a non-volatile storage device that has a non-volatile memory including a cache storage area and a main storage area, the method comprising: a) receiving data by the non-volatile storage device from a host device coupled to the non-volatile storage device; b) storing the received data in the cache storage area; and c) for at least one point in time: i) determining, by the non-volatile storage device, in accordance with at least one parameter selected from the group consisting of A) a historical rate at which other data was received by the non-volatile storage device from the host device during a time period preceding the receiving of the data of step (a); and B) an average time interval between successive host write requests received during the preceding time period; and whether to copy the data received in step (a) from the cache storage area of the non-volatile memory to the main storage area of the non-volatile memory; and ii) in the event of a positive determining, copying the data received in step (a) from the cache determined.

In some embodiments, the at least one parameter includes the historical rate at which the other data was received.

In some embodiments, the at least one parameter includes the average time interval between successive host write requests.

It is now disclosed for the first time a non-volatile storage device comprising: a) a device interface for coupling with a host device; b) a non-volatile memory including a cache storage area and a main storage area; and c) a controller operative to: i) receive data from the host device via the device interface; ii) determine whether to write the received data to the cache storage area before writing the received data to the main storage in accordance with at least one parameter selected from the group consisting of: A) a historical rate at which other data was received by the non-volatile storage device from the host device during a time period preceding the receiving of the data of step (c)(i); and B) an average time interval between successive host write requests received during the preceding time period; and iii) in the event of a positive determining, write the data received in step (c)(i) to the cache storage area as determined.

It is now disclosed for the first time a non-volatile storage device comprising: a) a device interface for coupling with a host device; b) a non-volatile memory including a cache storage area and a main storage area; and c) a controller operative to: i) receive, from the host device via the device interface, at least one request to store data in the non-volatile memory; ii) assess a rate at which data is required to be written to the non-volatile memory in order to fulfill the at least one data storage request; iii) in accordance with the assessed data-writing rate, determine whether to write the received data to the cache storage area before writing the received data to the main storage area; and iv) in the event of a positive determining, write the received data to the cache storage area as determined.

It is now disclosed for the first time a non-volatile storage device comprising: a) a device interface for coupling with a host device; b) a non-volatile memory including a cache storage area and a main storage area; and c) a controller operative to: i) receive, from the host device via the device interface, a request to store data in the non-volatile memory; ii) if the non-volatile storage device is in a store-to-cache-first mode at a time that the request is received, write the received data to the cache storage area before writing the received data to the main storage area; iii) if the non-volatile storage device is in a bypass-cache mode at a time that the request is received, write the received data to the main storage area without writing the received data to the cache storage area of the non-volatile memory; and iv) effect a mode transition, by the storage device, from the bypass-cache mode to the store-to-cache-first mode in response to a detected reading, by the host, of a storage ready/busy flag that returned a busy status.

It is now disclosed for the first time a non-volatile storage device comprising: a) a device interface for coupling with a host device; b) a non-volatile memory including a cache storage area and a main storage area; and c) a controller operative to: i) receive data from the host device via the device interface; ii) store the received data in the cache storage area; and iii) for at least one point in time: A) determine in accordance with at least one parameter selected from the group consisting of: I) a historical rate at which other data was received by the non-volatile storage device from the host device during a time period preceding the receiving of the data of step (a); and II) an average time interval between successive host write requests received during the preceding time period; and whether to copy the data received in step c(i) from the cache storage area to the main storage area; and iv) in the event of a positive determining, copying the data received in step c(i) from the cache storage area as determined.

It is noted that features described above as pertaining to certain embodiments may also be included in other embodiments, unless indicated to the contrary herein below.

DETAILED DESCRIPTION

The claims below will be better understood by referring to the present detailed description of example embodiments with reference to the figures. The description, embodiments and figures are not to be taken as limiting the scope of the claims. It should be understood that not every feature of the presently disclosed methods and apparatuses is necessary in every implementation. It should also be understood that throughout this disclosure, where a process or method is shown or described, the steps of the method may be performed in any order or simultaneously, unless it is clear from the context that one step depends on another being performed first. As used throughout this application, the word "may" is used in a permissive sense (i.e., meaning "having the potential to'), rather than the mandatory sense (i.e. meaning "must").

Some embodiments of the present invention relate to utilizing certain historical and/or predicted 'performance data' when deciding whether: (i) to store data to a cache storage area before storing the data to a main storage area of a non-volatile memory; or (ii) to 'bypass' the cache storage area by storing the data 'directly' in the main storage area. In particular embodiments, the decision of whether or not to write 'incoming data' to the cache storage area may be carried out in accordance with one or more of: (i) historical rates at which data has been received by a peripheral storage device from a host device ('Parameter A') (see FIG. 5); (ii) an average time interval between successive host write requires received during a preceding time period ('Parameter B') (see FIG. 6); (iii) an assessed data-writing rate at which data is required to be written to non-volatile memory in order to fulfill at least one data storage request ('Parameter C') (see FIG. 7); and/or (iv) one or more additional parameters described below. In the event of a 'positive' decision (i.e. a decision to store the data to the cache storage area of the non-volatile memory), then the data is stored to the cache storage area as determined.

Furthermore, in some embodiments, a determining of whether or when to copy 'cache-residing data' (i.e. data that has already been written into the cache storage area) from the cache storage area to the main storage area may also be carried out in accordance with one or more of the aforementioned parameter(s) and/or other parameters described herein. These embodiments may be useful for determining and enforcing a 'non-volatile cache flushing' policy.

Figure 5:
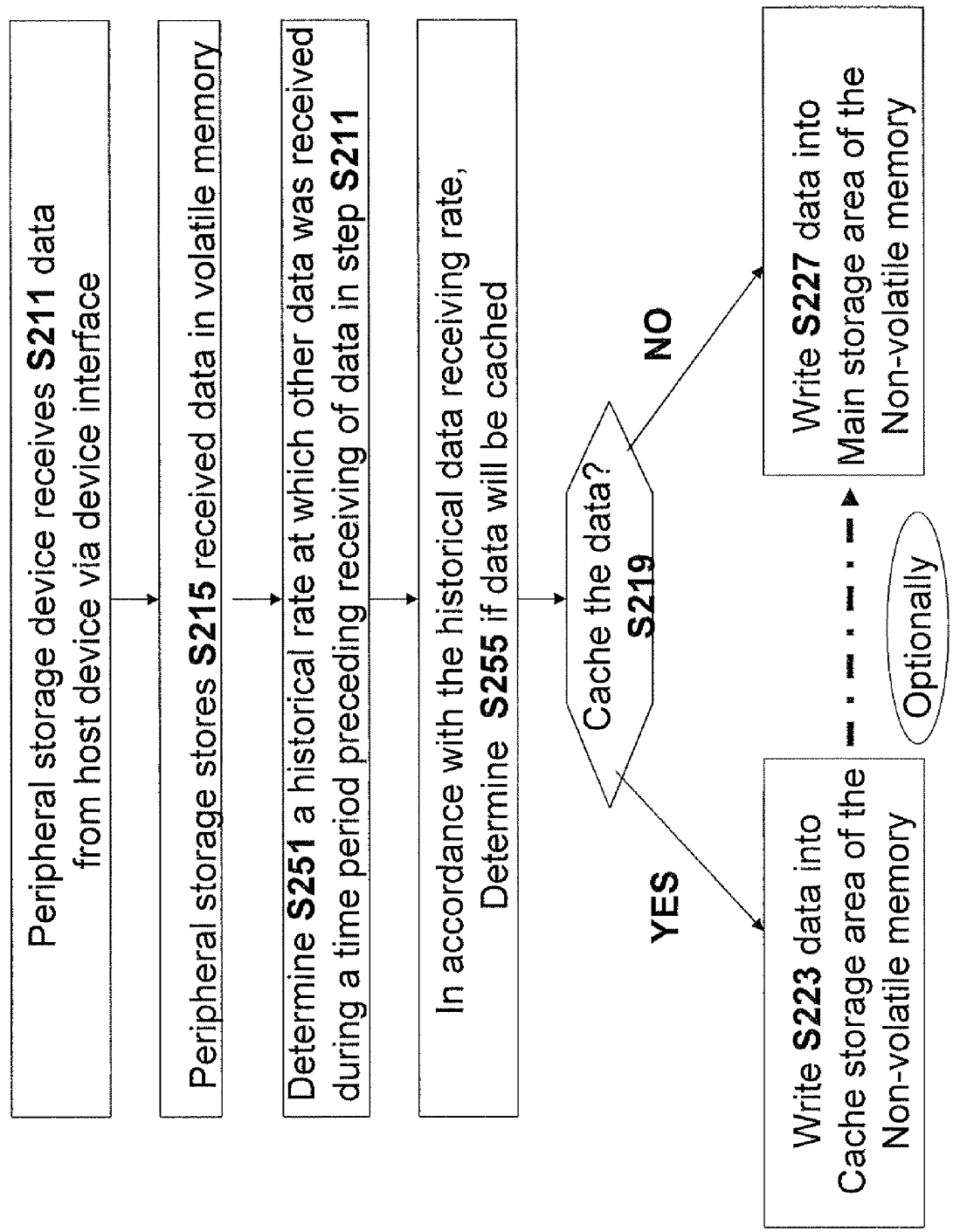
FIGS. 5-7, and 8A are flow charts of routines for storing data to a non-volatile memory including a cache storage area and a main storage area.

An Introductory Discussion of Techniques for Writing Data to a Cache Storage Area and/or Main Storage Area of a Peripheral Non-Volatile Memory Storage Device In one non-limiting example related to "parameter A" and FIG. 5, in the event that the peripheral storage device has recently been 'flooded' with a 'large' amount of data from the host device (i.e. data sent from the host device which needs to be stored in non-volatile storage within the peripheral storage device) in a 'short' period of time, then it may be assumed that there is an 'elevated' likelihood that in the near future, the rate at which data will be received will continue to be relatively 'high.' In this case, incoming data is stored first to the cache, which is associated with a 'faster writing speed,' rather than directly writing to the 'slower' main storage region. This may be useful for minimizing the risk of a slow response time (i.e. as detectable by the host) for completing the execution of one or more write commands received from the host device.

Conversely, if, historically, the rate at which data is written from the host device is historically 'low,' it may be preferred, when receiving data from the host device, to bypass the cache storage area and to write the received data 'directly' to the main storage area. In this case, refraining from storing the data to the cache storage area may be useful, for example, for minimizing the number of write operations sustained by the cache storage area of the non-volatile (for example, flash) memory, thereby extending the lifespan of cache area and/or the peripheral non-volatile storage device.

Thus, in this particular example, the rate at which data has been historically received may be indicative of an estimated rate at which data will be received from the host device in the future.

Figure 7:
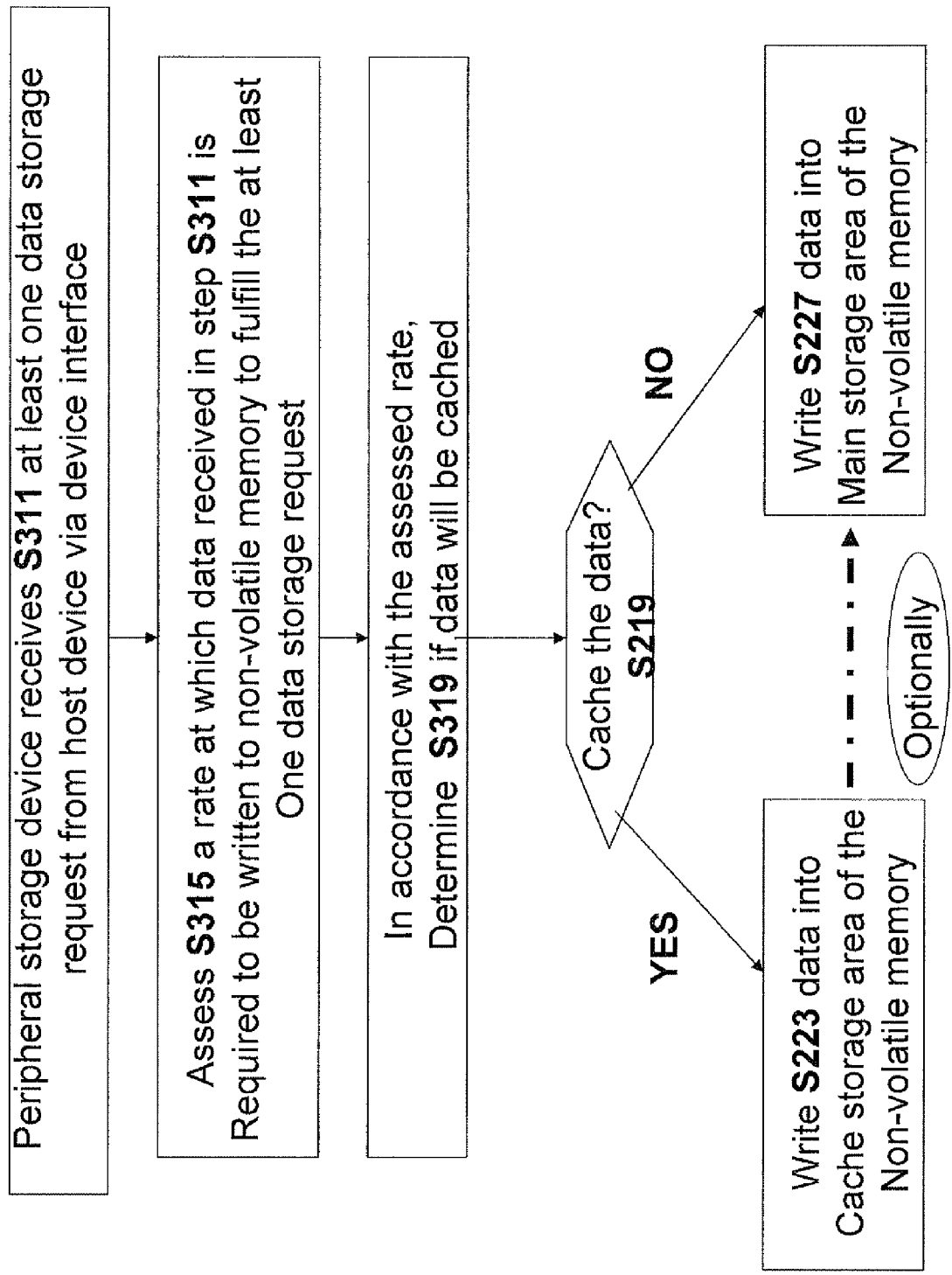

In one non-limiting example related to "parameter B" and FIG. 7, an average time interval between successive host write-requests received during a preceding time period ('Parameter B') may be indicative of a magnitude of a workload imposed upon the peripheral storage device by the host device during the preceding time period. In the event that the average time interval between successive host write-requests has been relatively 'small,' this may be indicative of (i) a situation where the host has provided many write requests in a relatively short period of time, thereby imposing a relatively 'large' workload upon the peripheral storage device; and (ii) an elevated likelihood that the peripheral storage device will need to handle a large workload in the future. In this case, if the average time interval is relatively low (for example, below some threshold, pre-determined or otherwise), it may be preferred to first write incoming data received from the host device to the cache storage area, in order to minimize the risk of a slow response time (i.e. as detectable by the host) for completing the execution of one or more write commands received by the host device.

Conversely, if, historically, the average time between successive write requests is relatively 'large,' this may be indicative of (i) a host that has been relatively 'inactive' in the past; and (ii) a host which has an elevated likelihood of being inactive in the future (or a reduced likelihood of being active). In this case, it may be preferred, when receiving data from the host device, to bypass the cache storage area and to write the received data 'directly' to the main storage area, despite the slower writing speed. In this case, refraining from storing the data to the cache storage area may be useful, for example, for minimizing the number of write operations sustained by the cache storage area of the non-volatile (for example, flash) memory, thereby extending the lifespan of cache area and/or the peripheral non-volatile storage device.

In one non-limiting example related to "parameter C" and FIG. 7, a rate at which data received in one or more command(s) from the host is required to be written to non-volatile memory of the peripheral non-volatile memory device is assessed. In one non-limiting example, information describing this rate may be received explicitly from the host. In the event that the device is required to write the data "very quickly," then it may be advantageous, in order to provide the required performance, to first write incoming data received from the host device to the cache storage area (which is associated with relatively "fast" writing), in order to meet the assessed writing rate requirements.

Conversely, if only a relatively "low rate" of data-storage to non-volatile memory is required, it may be preferred, when receiving data from the host device, to bypass the cache storage area and to write the received data 'directly' to the main storage area, despite the slower writing speed. In this case, refraining from storing the data to the cache storage area may be useful, for example, for minimizing the number of write operations sustained by the cache storage area of the non-volatile (for example, flash) memory, thereby extending the lifespan of cache area and/or the peripheral non-volatile storage device.

It is noted that in different embodiments, the decision of whether or not to write to cache before writing to main storage may be carried out "autonomously" by a peripheral non-volatile storage device, without receiving any caching instructions from the host device.

An Introductory Discussion of Techniques for Copying Data from a Cache Storage Area of Non-Volatile Memory of a Peripheral Non-Volatile Memory Storage Device to a Main Storage Area As noted earlier, some embodiments of the present invention relate to a technique for determining whether or when to copy 'cache-residing data' (i.e. data that has already been written into the cache storage area) from the cache storage area to the main storage area. The data is copied from the cache storage area to the main storage area contingent upon and/or in accordance with this determining.

In some embodiments, the determining of whether or when to copy 'cache-residing data' from the cache storage area may be carried out in accordance with one or more of: (i) historical rates at which data has been received by a peripheral storage device from a host device ('Parameter A') (see FIG. 5); (ii) an average time interval between successive host write requests received during a preceding time period ('Parameter B') (see FIG. 6); and/or (iiii) one or more additional parameters described below.

Figure 9:
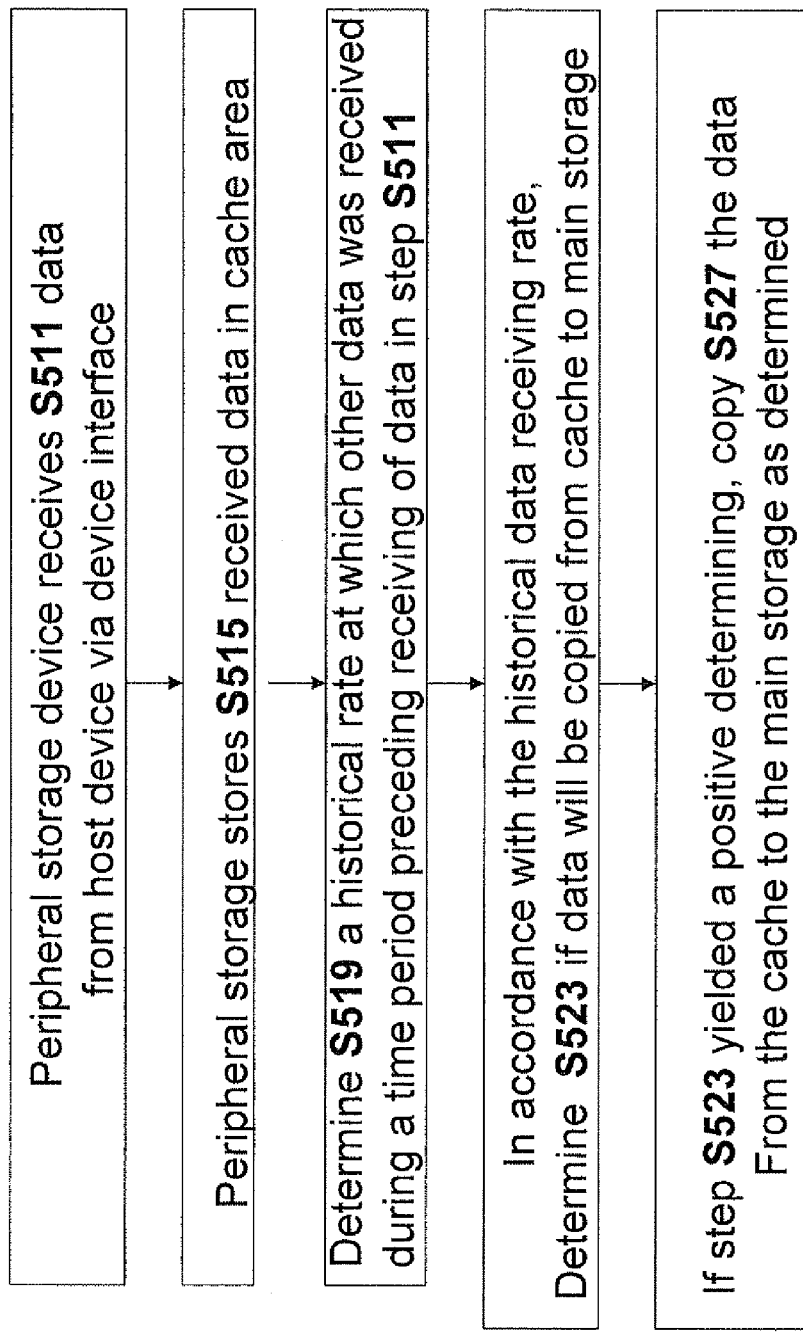
FIGS. 9-10 are flow charts of routines for enforcing a cache flushing policy.

In one non-limiting example related to "parameter A" and FIG. 9, in the event that the peripheral storage device has recently been 'flooded' with a 'large' amount of data from the host device (i.e. data sent from the host device which needs to be stored in non-volatile storage within the peripheral storage device) in a 'short' period of time, then it may be assumed that there is an 'elevated' likelihood that in the near future the rate at which data will be received will continue to be relatively 'high.' In this case, it may be advantageous to postpone flushing the cache (postpone copying data from the cache storage area to the main storage area) and/or flush the cache at a relatively 'low rate.' In particular, the cache copying operations whereby data is copied from the cache storage area to the main storage area may consume device resources of the peripheral non-volatile storage device, and may limit the amount of device resources available for handling "incoming data." Thus, in the event that it is predicted that the storage device will be relatively "flooded" with new incoming data, diverting device resources to cache flushing may increase the risk that the peripheral storage device will not be able to "handle" the incoming data (i.e. as detectable by the host device) at the rate required and/or required.

Conversely, if, historically, the rate at which data is written from the host device is historically 'low,' it may be preferred, when receiving data from the host device, to take advantage of the situation by dedicating device resources to the task of copying data from the cache storage area to the main storage area. Because it is anticipated that the demands placed upon the peripheral storage device by the host device will be relatively "low" in the near future, it may be assumed that the risk of the device failing to meet any of these demands will be relatively low during the time period where device resources are dedicated to copying data from the cache, providing an opportunity to "clear" the cache for new incoming data.

Figure 10:
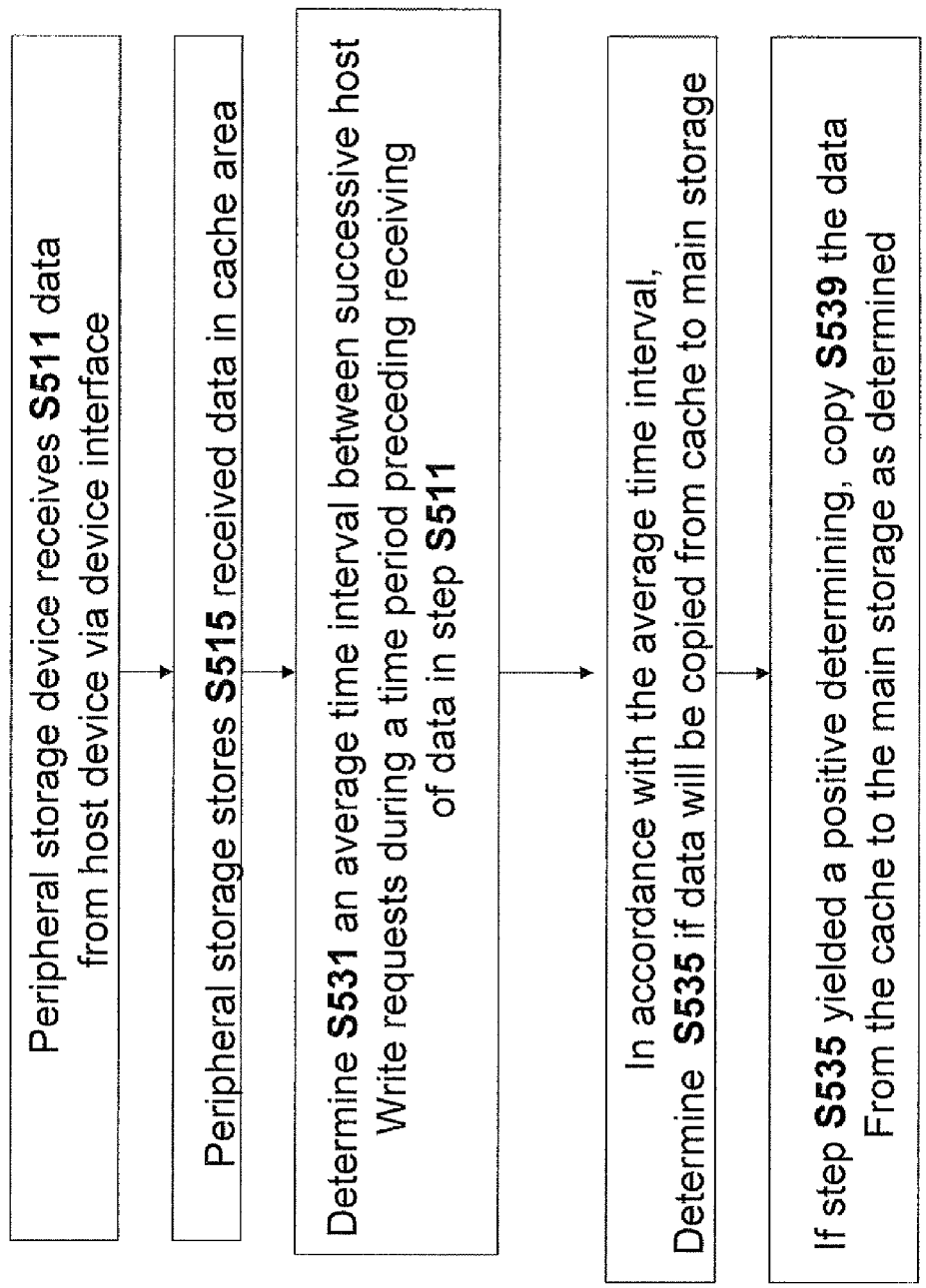

In one non-limiting example related to "parameter B" and FIG. 10, an average time interval between successive host write-requests received during a preceding time period ('Parameter B') is indicative of how 'active' the host device has been in sending commands or specific tasks to the peripheral storage device. In the event that the average time interval between successive host write-requests has been relatively 'small,' this may be indicative of (i) a situation where the host has provided many write requests in a relatively short period of time, thereby imposing a relatively 'large' workload upon the peripheral storage device; and (ii) an elevated likelihood that the peripheral storage device will need to handle a large workload in the future. In this case, if the average time interval is relatively low (for example, below some threshold, pre-determined or otherwise), it may be advantageous to postpone flushing the cache (postpone copying data from the cache storage area to the main storage area) and/or flush the cache at a relatively 'low rate.' In particular, the cache copying operations whereby data is copied from the cache storage area to the main storage area may consume device resources of the peripheral non-volatile storage device, and may limit the amount of device resources available for handling "incoming data." Thus, in the event that it is predicted (i.e. according to the average time interval between successive host write-requests received during a preceding time) that the storage device will need to handle a relatively 'large' workload, then diverting device resources to cache flushing may increase the risk that the peripheral storage device will not be able to "handle" the incoming data (i.e. as detectable by the host device) at the rate required and/or required.

Conversely, if, historically, the average time between successive write requests is relatively 'large,' this may be indicative of (i) a host that has been relatively 'inactive' in the past; and (ii) a host which has an elevated likelihood of being inactive in the future (or a reduced likelihood of being active). In this case, it may be preferred, to take advantage of the situation by dedicating device resources to the task of copying data from the cache storage area to the main storage area. Because it is anticipated that the demands placed upon the peripheral storage device by the host device will be relatively "low" in the near future, it may be assumed that the risk of the device failing to meet any of these demands will be relatively low during the time period where device resources are dedicated to copying data from the cache, providing an opportunity to "clear" the cache for new incoming data.

It is noted that in different embodiments, the decision of whether or not (or when) to copy 'cache-residing data' from the cache area to the main area may be carried out "autonomously" by a peripheral flash device, without receiving any caching instructions from the host device.

Figure 1:
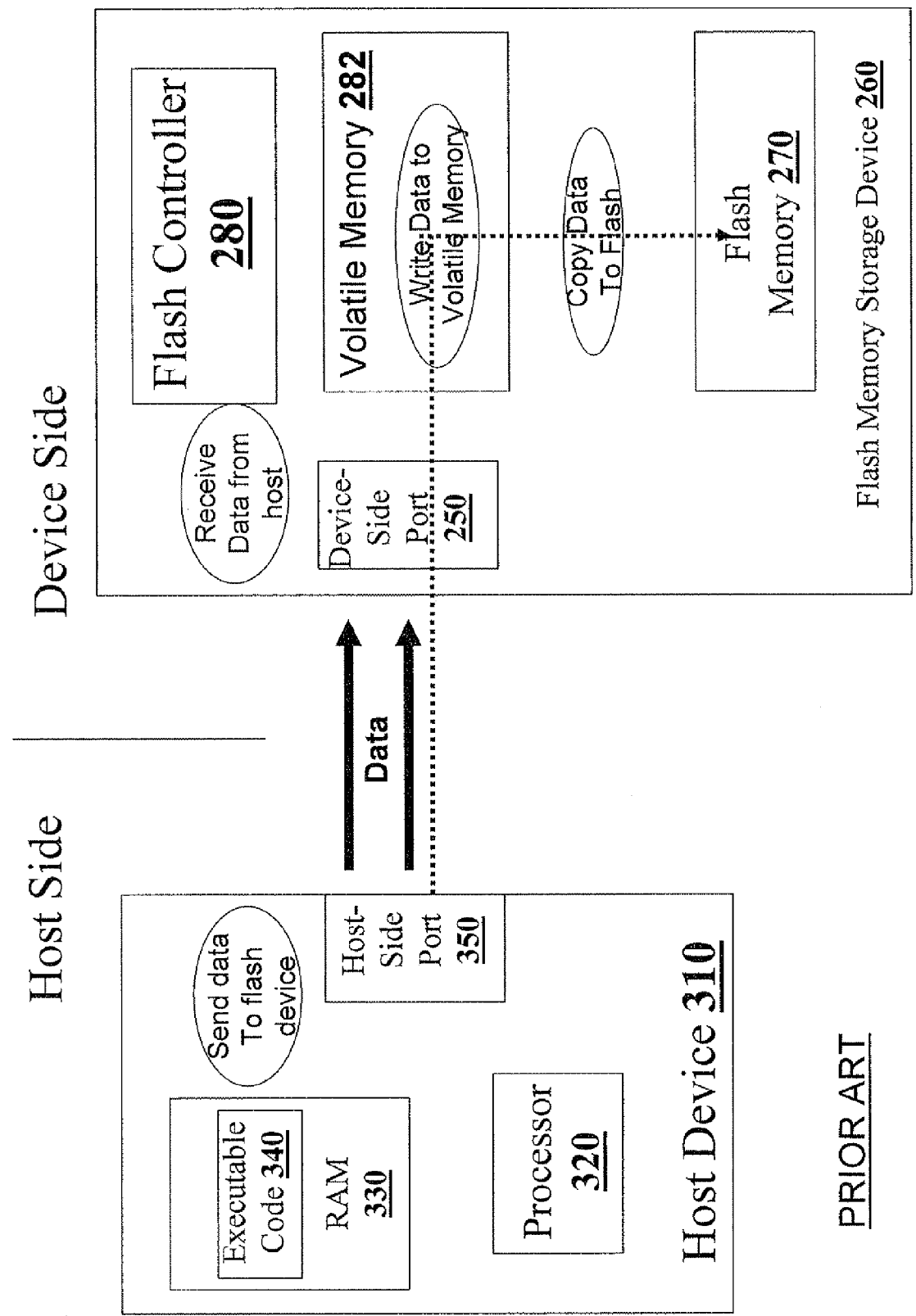
FIG. 1 is a block diagram of a prior art peripheral storage device coupled to a host device.
Figure 2A:
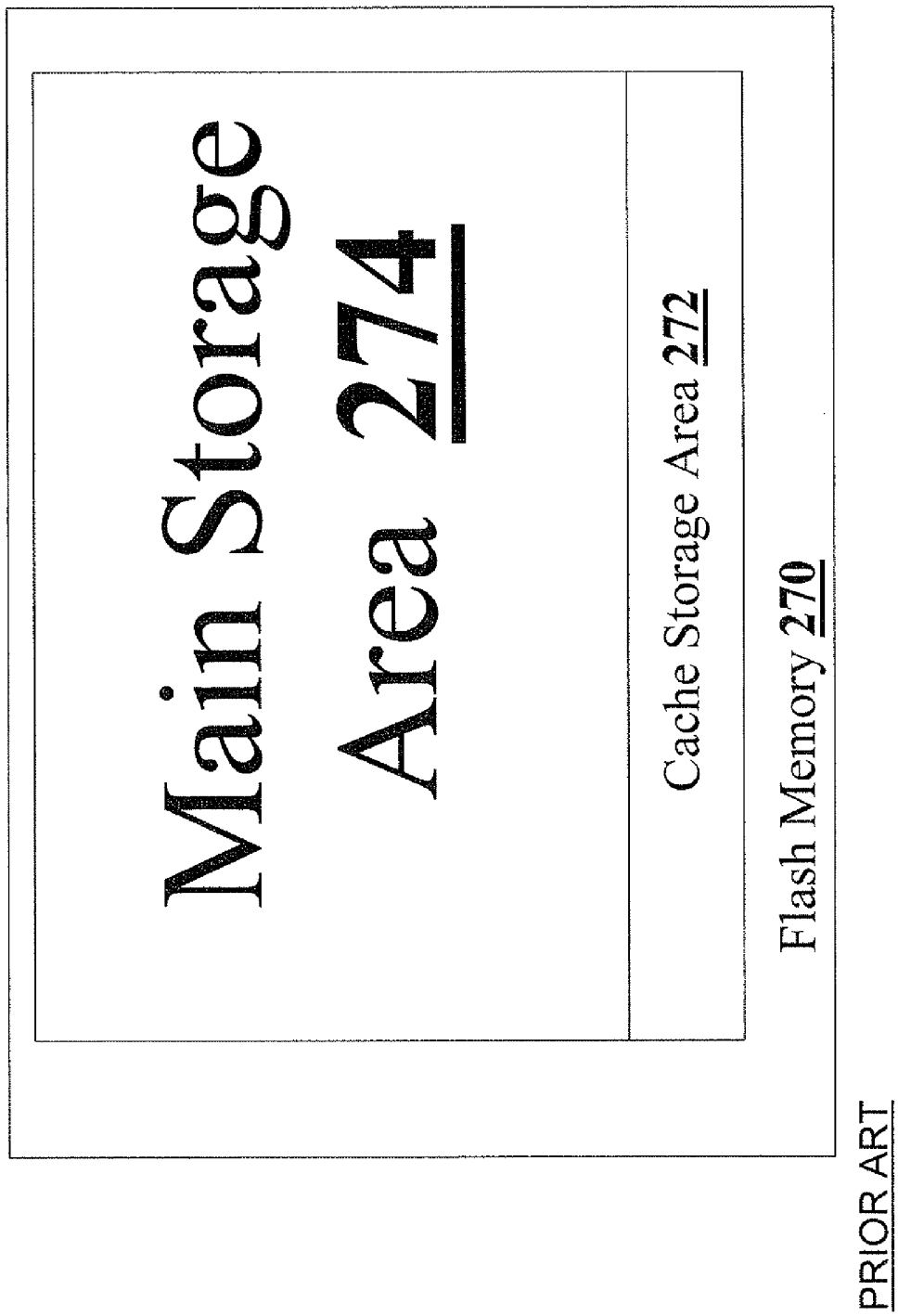
FIGS. 2A-2D, 3 describe prior art routines for storing data to a non-volatile memory of a peripheral storage device.
Figure 2B:
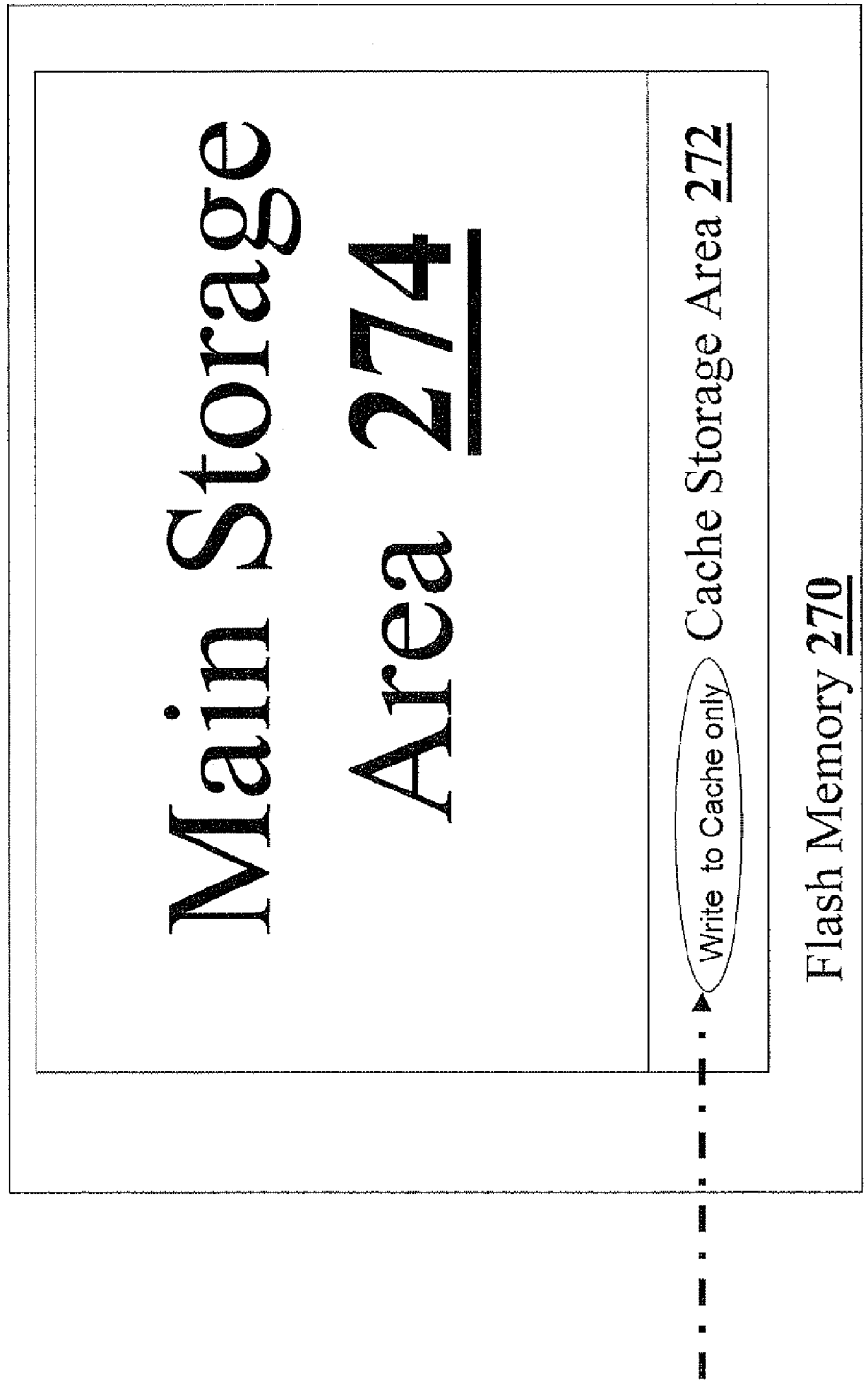
Figure 2C:
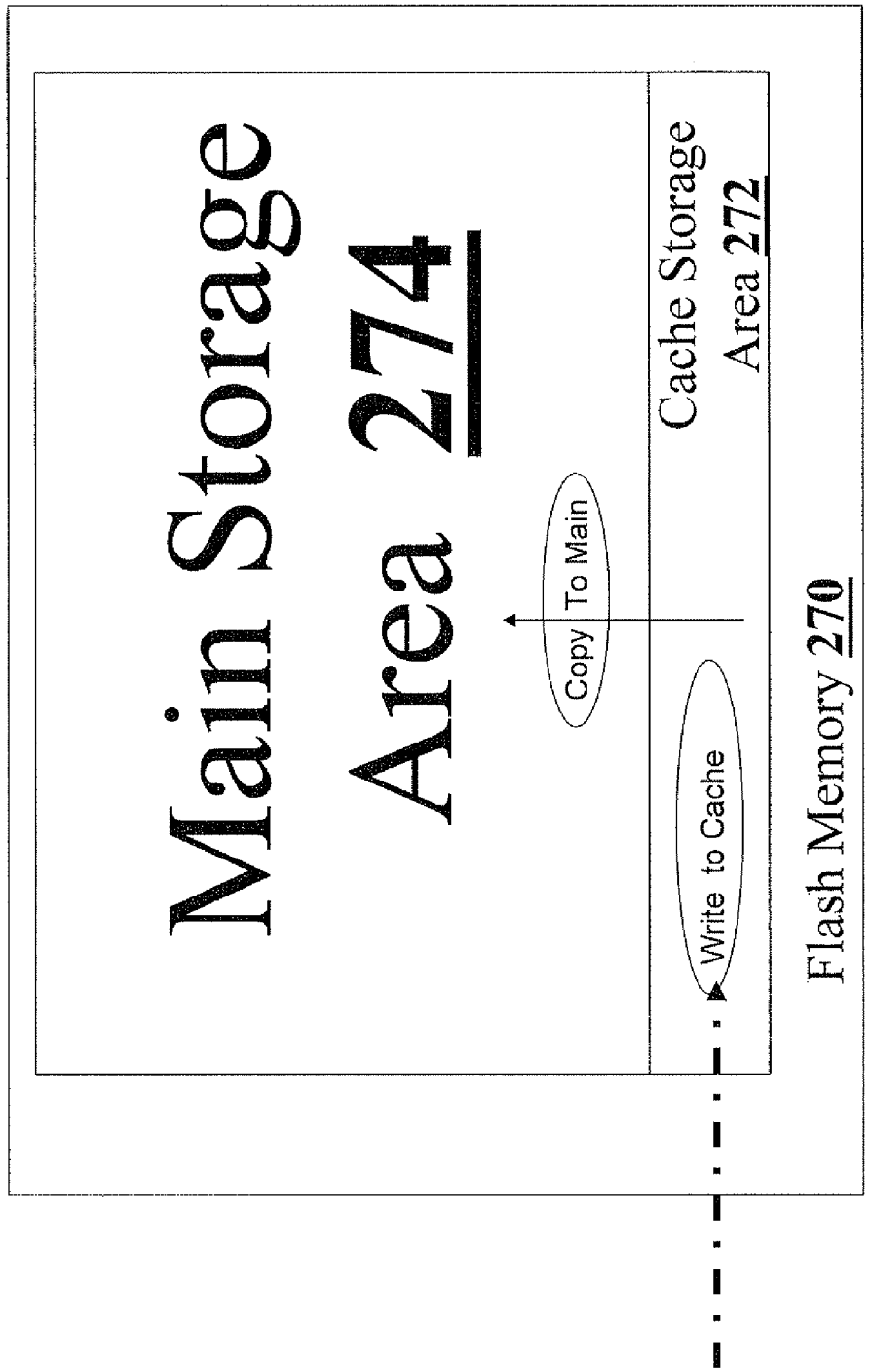
Figure 2D:
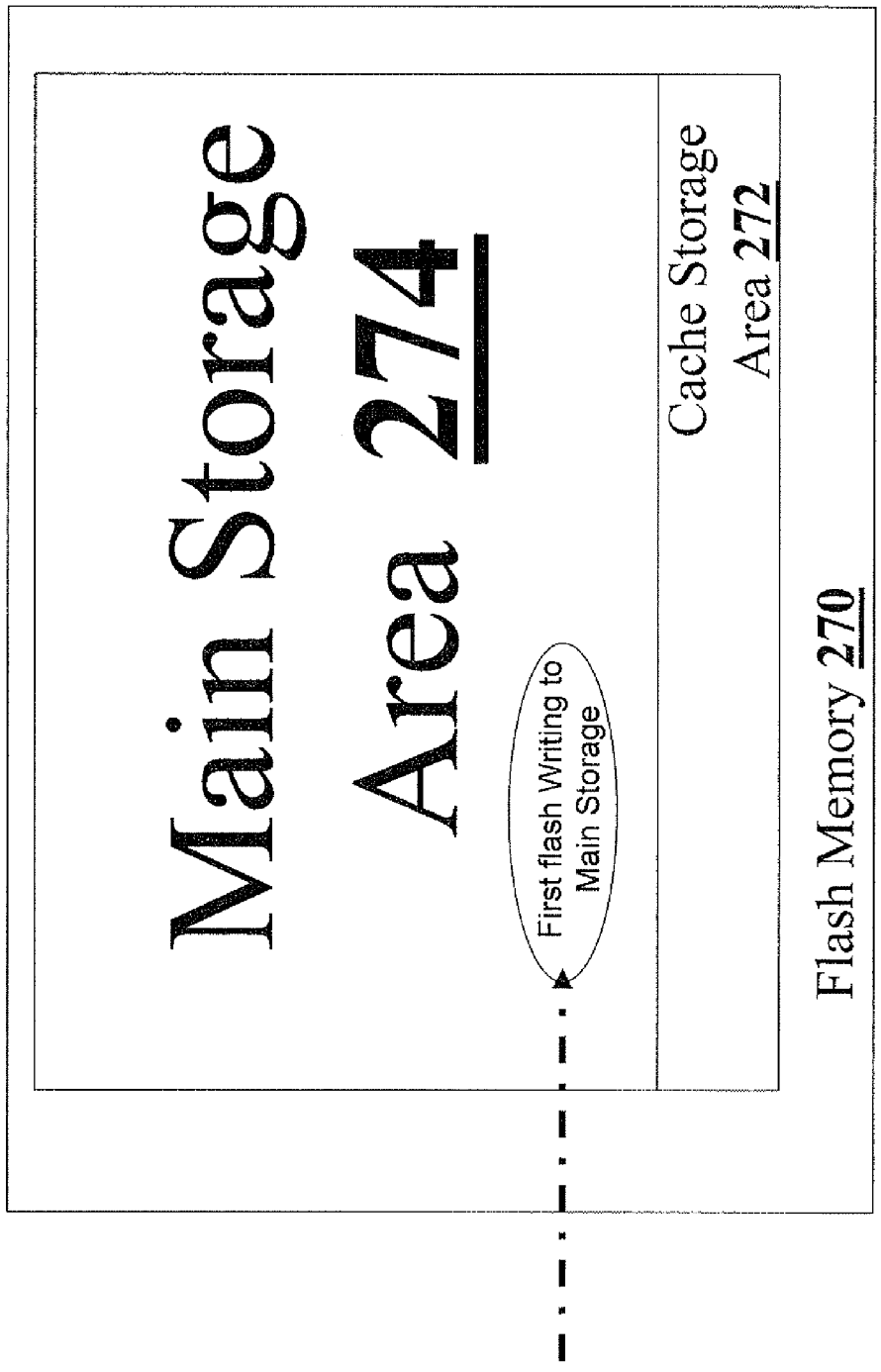
Figure 3:
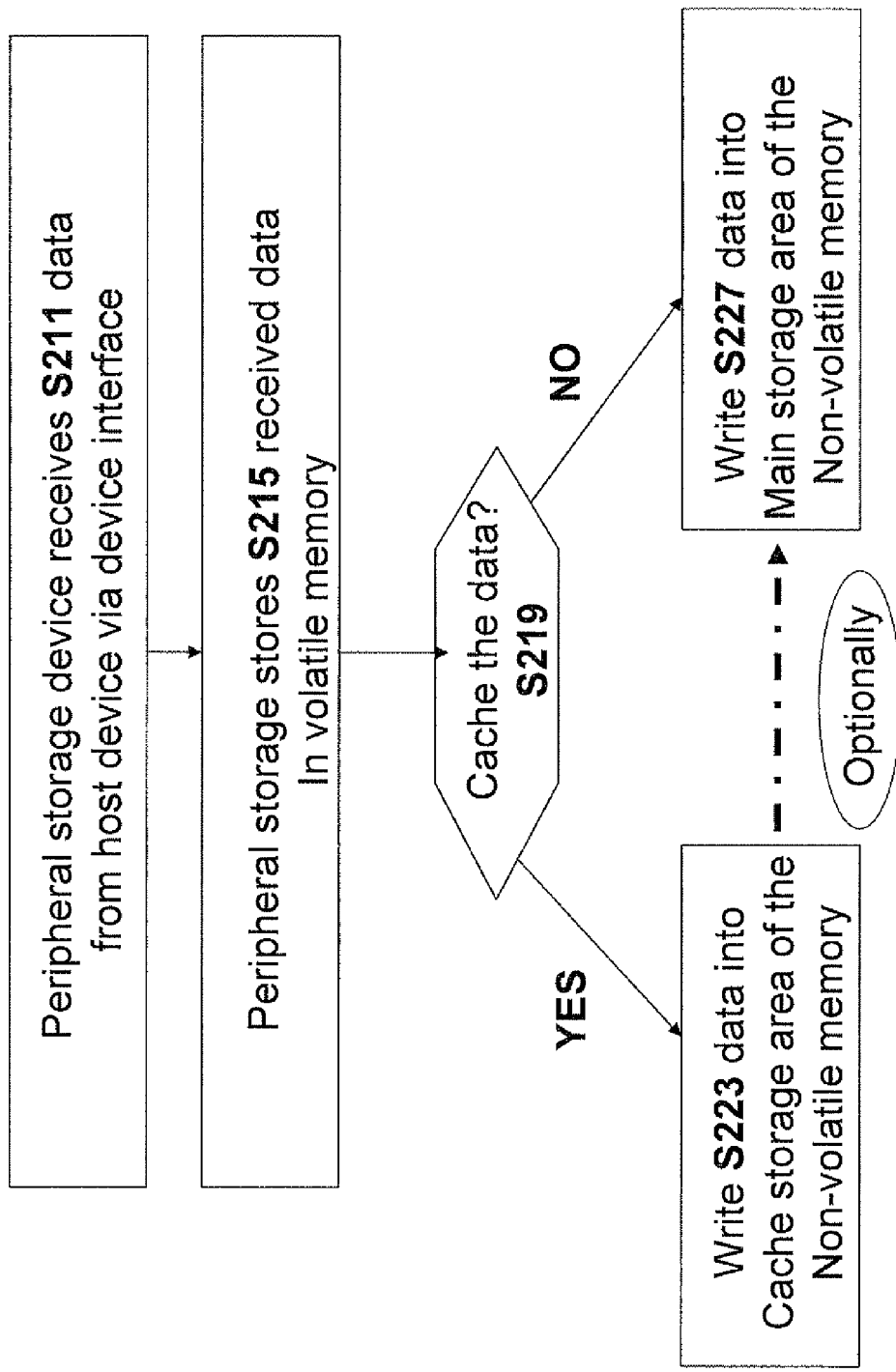
Figure 4:
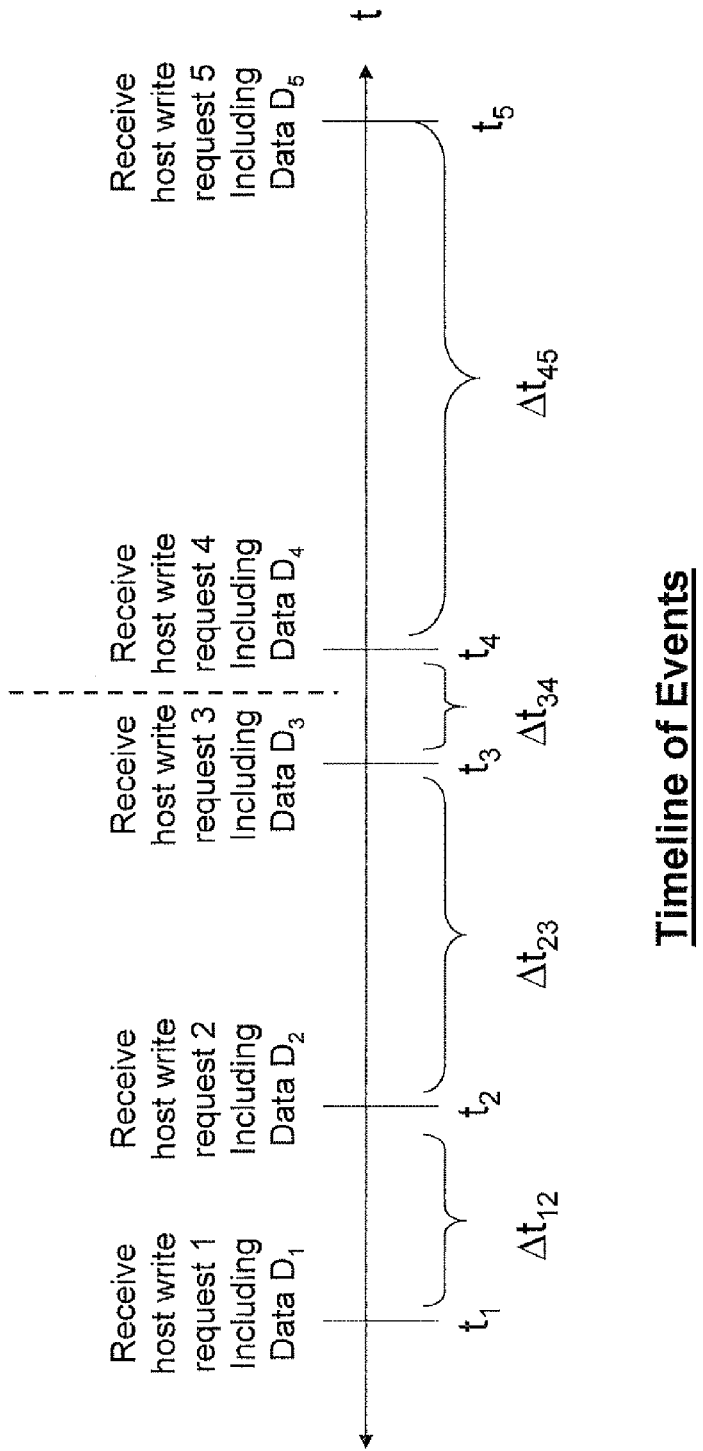
FIG. 4 is a timeline describing information which may be utilized to enforce one or more cache-related policy(ies).

Description of FIG. 4

FIG. 4 is a timeline describing information which may be utilized to enforce one or more cache-related policy(ies).

At time $t_1$, a first "write request" including data $D_1$ is received at peripheral storage device 260 from host device 310 via respective interfaces 350, 250. At time $t_2$, a second "write request" including data $D_2$ is received at peripheral storage device 260 from host device 310 via respective interfaces 350, 250. At time $t_3$, a third "write request" including data $D_3$ is received at peripheral storage device 260 from host device 310 via respective interfaces 350, 250. At time $t_4$, a fourth "write request" including data $D_4$ is received at peripheral storage device 260 from host device 310 via respective interfaces 350, 250. At time $t_5$, a fifth "write request" including data $D_5$ is received at peripheral storage device 260 from host device 310 via respective interfaces 350, 250.

The "time gap" between (i) the receiving of data D2/the receiving of the second write request and (ii) the receiving of data of D1/the receiving of the first write request is $\Delta t_{12}$. The "time gap" between (i) the receiving of data D3//the receiving of the third write request and (ii) the receiving of data of D2/the receiving of the second write request is $\Delta t_{23}$. The "time gap" between (i) the receiving of data D4/the receiving of the fourth write request and (ii) the receiving of data of D3/the receiving of the third write request is $\Delta t_{34}$. The "time gap" between (i) the receiving of data D5/the receiving of the fifth write request and (ii) the receiving of data of D4/the receiving of the fourth write request is $\Delta t_{45}$.

A Discussion of FIG. 5

FIG. 5 is a flow chart describing a technique for storing data to a flash memory 270. In step S211, the peripheral storage device 260 receives data from host device 310. In step S215, this data is stored in volatile memory (for example within flash controller 280 or at any other location within non-volatile memory device 260).

In step S251, a historical rate at which other data was received during a time period preceding the receiving of data in step S211 is assessed or determined.

Reference is made to both FIG. 4 and FIG. 5. In one example, step S211 is carried out at time $t_4$ as part of receiving command 4. In this example, the "data" received is $D_4$. In this example, the preceding time period begins at time $t_2 - \Delta t_{12}$ and ends at time $t_3 + \Delta t_{34}$. Thus, the total "length" of the preceding time interval is $(t_3 + \Delta t_{34}) - (t_2 - \Delta t_{12})$, and the total amount of "other data" received during the "preceding time interval" (i.e. which preceded time $t_4$) is $(D_2 + D_3)$. Thus, in this example, the 'historical rate' R at which the "other data" is received during the "historical time period" is $$\frac{D_2 + D_3}{(t_3 + \Delta t_{34}) - (t_2 - \Delta t_{12})}.$$

In step S255, it is determined in accordance with the historical data receiving rate R if the data will be cached. In one non-limiting example, R is compared with some sort of threshold (for example, a predetermined threshold value and/or a threshold value which changes as a function of time and/or any other threshold value): (i) in the event that R exceeds the threshold, the "yes" branch leaving S219 is taken; and (ii) otherwise, the "no" branch leaving 5219 is taken.

In the former case, data is written to the cache storage area of the non-volatile memory 272 before being written (if at all) to the main storage area 274. For the latter "cache-bypass" case, data is written to the main storage area of the non-volatile memory 274 without being written to the cache storage area 272.

Figure 6:
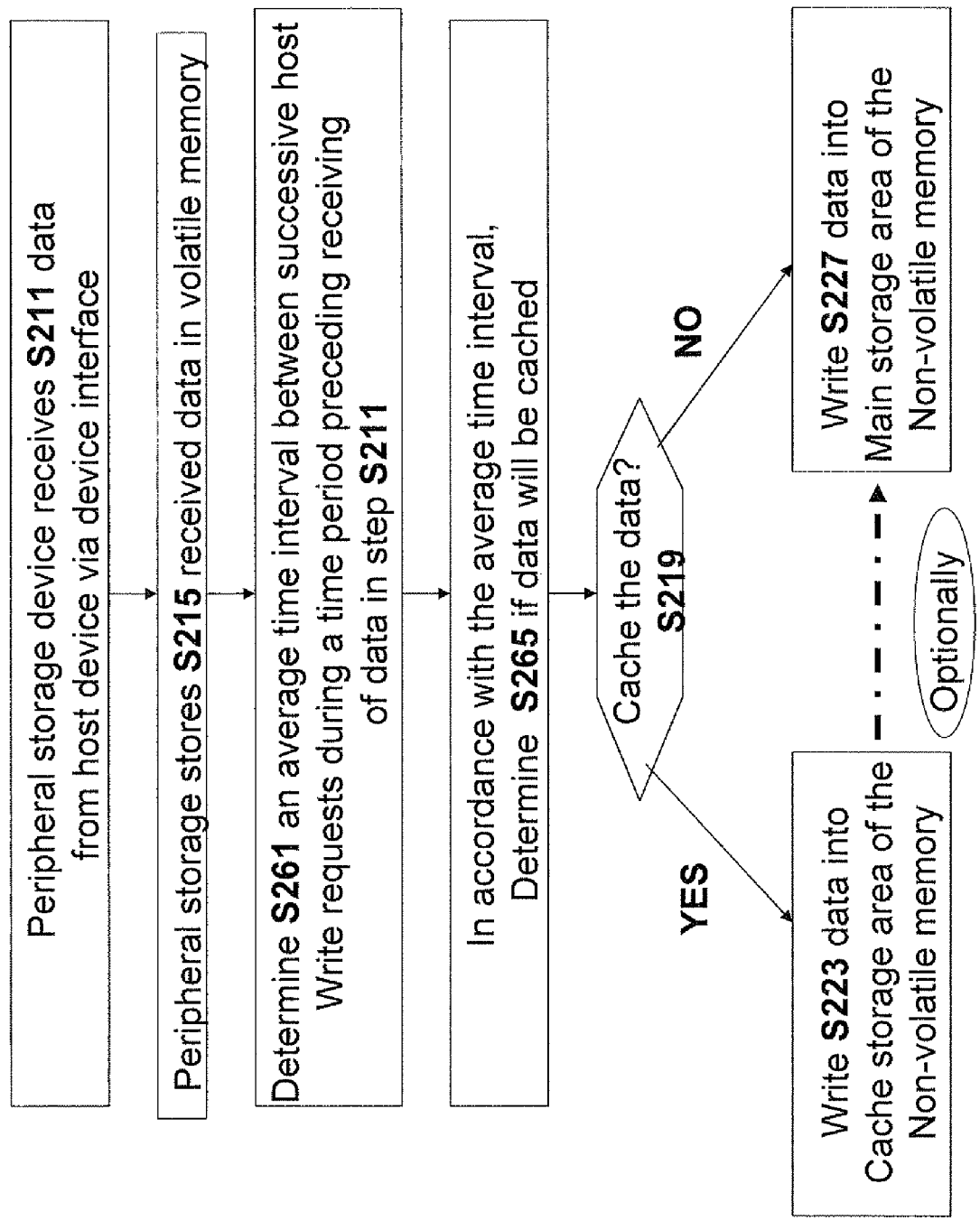

A Discussion of FIG. 6

FIG. 6 is a flow chart describing a technique for storing data to a flash memory 270. In step S211, the peripheral storage device 260 receives data from host device 310. In step S215, this data is stored in volatile memory (for example within flash controller 280 or at any other location within non-volatile memory device 260).

In step S261, an average time interval between successive host write requests during a time period preceding the receiving of data in step S211 is assessed or determined.

Reference is made to both FIG. 4 and FIG. 6. In one example, step S211 is carried out at time $t_5$ as part of receiving command 5. In this example, the preceding time period begins at time $t_2-\Delta t_{12}$ and ends at time $t_4+\Delta t_{45}$. During this preceeding time period, three host write requests are received: the second write request at time $t_2$, the third write request at time $t_3$, and the fourth write request at time $t_4$. During this time interval, there are two "time intervals between successive host write requests": $\Delta t_{23}$ and $\Delta t_{34}$, Thus, in this non-limiting example, the average time interval between successive host write requests $T_{AVG}$ is $$\frac{\Delta t_{23} + \Delta t_{34}}{2}.$$

In step S265 it is determined in accordance with the average time interval between successive host write requests $T_{AVG}$ if the data will be cached. In one non-limiting example, $T_{AVG}$ is compared with some sort of threshold (for example, a predetermined threshold value and/or a threshold value which changes as a function of time and/or any other threshold value): (i) in the event that $T_{AVG}$ is less than the threshold, the "yes" branch leaving 5219 is taken; and (ii) otherwise, the "no" branch leaving S219 is taken.

In the former case, data is written to the cache storage area of the non-volatile memory 272 before being written (if at all) to the main storage area 274. For the latter "cache-bypass" case, data is written to the main storage area of the non-volatile memory 274 without being written to the cache storage area 272.

A Discussion of FIG. 7

FIG. 7 is a flow chart describing a technique for storing data to a flash memory 270. In step S311, the peripheral storage device 260 receives data from host device 310. In step S315, this data is stored in volatile memory (for example within flash controller 280 or at any other location within non-volatile memory device 260).

In step S315 a rate at which data received in step S311 is required to be written to non-volatile memory to fulfill the at least one data storage request may be assessed. In one non-limiting example, this information may be received explicitly—for example, the command set of the peripheral storage device may include a write command with a syntax where the host device requests that a certain amount of data be stored within a certain amount of time. The rate at which data is required to be written may then be considered to be a function of (i) the amount of data received from the host device in the particular command; and (ii) the amount of time in which the data is to be written, according to the request from the host device.

In yet another example, historical patterns may be used to estimate a rate in which data is required to be written to non-volatile memory.

In step S319, it is determined in accordance with the assessed rate AR at which data is required to be written if the data will be cached. In one non-limiting example, AR is compared with some sort of threshold (for example, a predetermined threshold value and/or a threshold value which changes as a function of time and/or any other threshold value): (i) in the event that AR is greater than the threshold (i.e. requiring that data is written relatively quickly), the "yes" branch leaving S219 is taken; and (ii) otherwise, the "no" branch leaving S219 is taken.

In the former case, data is written to the cache storage area of the non-volatile memory 272 before being written (if at all) to the main storage area 274. For the latter "cache-bypass" case, data is written to the main storage area of the non-volatile memory 274 without being written to the cache storage area 272.

Figure 8A:
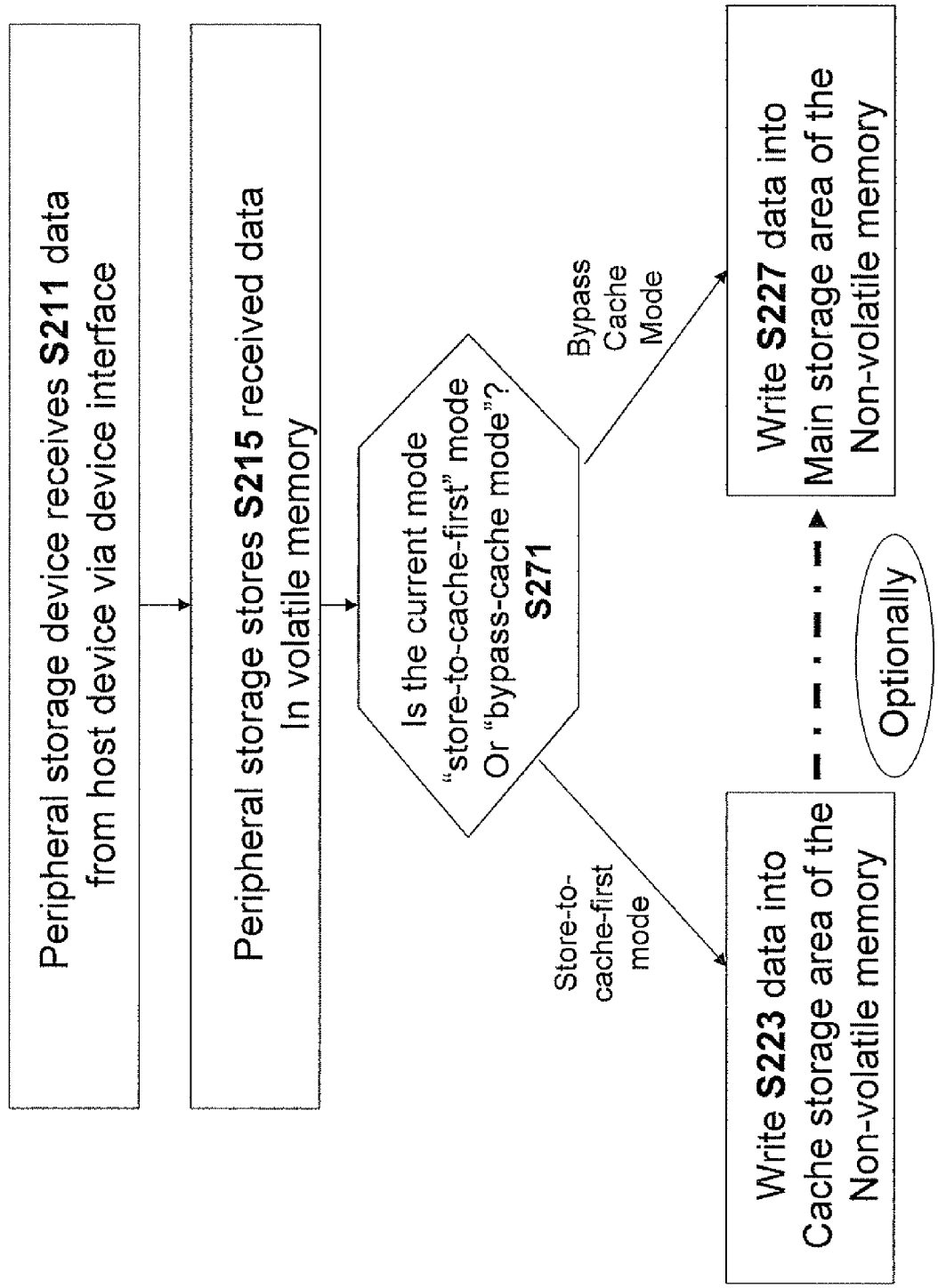
Figure 8B:
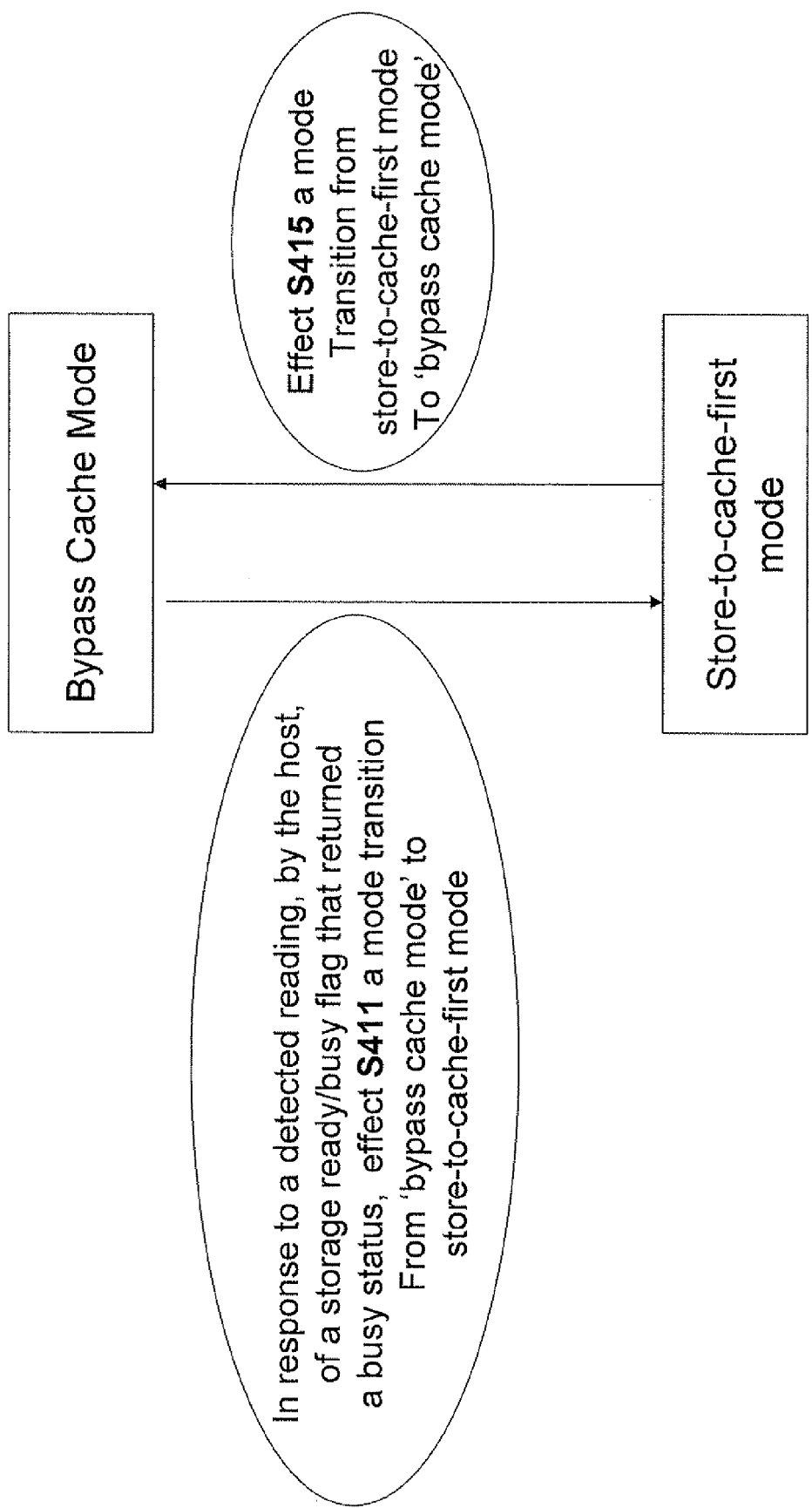
FIG. 8B is a flow chart of a routine for transitioning between a bypass cache mode and a store-to-cache-first mode.

A Discussion of FIGS. 8A-8B

Reference is made to FIGS. 8A-8B. According to the example of FIGS. 8A-8B, if the host reads a storage ready/busy flag (i.e. of the peripheral storage device 260) that returned a busy status, this may be indicative that the peripheral storage device is not successfully writing data to non-volatile storage at the rate "desired" by the host device. In this case, in order to provide "better performance" for the host device, it may be desirable to first write incoming data to the cache storage area, utilizing the "fast writing" property provided by the cache storage area.

FIG. 8A is a flow chart describing a technique for storing data to a flash memory 270. According to embodiments of FIG. 8A, peripheral storage device 260 provides at least two device "modes": a first mode referred to as the "store-to-cache-first" device mode whereby data is stored in the cache storage area 272 before being written to the main storage area 274, and a second mode referred to as "bypass-cache mode" whereby data is stored in the main storage area 274 without being written to the cache storage area 272. Information about a "current mode" may be stored in any location, including but not limited to flash controller 280, volatile memory 282 and flash memory 270.

In step S211 of FIG. 8A, the peripheral storage device 260 receives data from host device 310. In step S215, this data is stored in volatile memory (for example within flash controller 280 or at any other location within non-volatile memory device 260).

FIG. 8B is a flow chart of routine for transitioning between the two aforementioned device modes. Thus, in step S411, the device may transition from the "bypass cache mode" to the store-to-cache-first mode in response to a reading, by the host, of a storage ready/busy flag (i.e. the host queries the peripheral storage device of its status, and the peripheral storage device returns a storage ready/busy flag to the host device which is read by the host device). This indicates both that the host device has received information that the peripheral storage device is "busy" and that it may be advantageous to use a "faster writing mode" in order to maximize performance provided to the host device.

In step S415, peripheral storage device 260 effects a transition back to bypass cache mode in accordance with one or more events. In one non-limiting example, this transition in accordance with a "fullness" of the cache storage area (i.e. how full the cache area is 272 with previously-written data)— for example, if the cache is close to "full" it may be advisable to effect the transition from the store-to-cache-first mode to a bypass cache mode, since there is not enough space in the cache to write incoming data into the flash.

Referring now to step S271 of FIG. 8A, it is noted that: (i) in the event that peripheral device 260 is in "store-to-cache-first" mode, the "left" branch leaving step S271 is taken; and (ii) otherwise, the "right" branch leaving step S271 is taken.

In the former case, data is written to the cache storage area of the non-volatile memory 272 before being written (if at all) to the main storage area 274. For the latter "cache-bypass"

case, data is written to the main storage area of the non-volatile memory 274 without being written to the cache storage area 272.

A Discussion of FIGS. 9-10

FIGS. 5-8 describe routines for implementing a policy for storing incoming data to non-volatile memory 270 of a peripheral storage device 260.

FIG. 9-10 describe routines for copying data from a cache storage area 270 of a non-volatile memory to a main storage area 274 (see the earlier section entitled "An Introductory Discussion of Techniques for Copying Data from a Cache Storage Area of Non-Volatile Memory of a Peripheral Non-Volatile Memory Storage Device to a Main Storage Area").

Thus, in step S511, the peripheral storage device 260 receives data from host device 310. In step S515, this data is stored in the cache storage area 272 of non-volatile memory 270. In step S519, an historical rate at which other data was received during a time period preceding the receiving of data in step S511 is determined (see step S251 of FIG. 5).

In step S523, it is determined, in accordance with the historical data receiving rate, if data will be copied (i.e. at a particular time or in a particular time frame or at any time) from the cache storage area 272 to the main storage area 274. In one example: (i) in the event that the historical rate at which data is received from host 310 is relatively "low," it may be assumed that this is indicative that the device will receive data at a "relatively low" rate in the near-future, and that device resources may be allocated to data copying from the cache storage area 272 to the main storage area 274; (ii) conversely, in the event that the historical rate at which data is received from host 310 is relatively "high," it may be assumed that this is indicative that the device will receive data at a "relatively high" rate in the near future, and that it is preferable to postpone copying of data from the cache storage area 272 to the main storage area In step S523, if step S523 yielded a "positive determining" (i.e. a determining that data will be copied from the cache storage area 272 to the main storage area 274), then data is copied from the cache storage area 272 to the main storage area 274 as determined.

It is noted that any of the step(s) of FIG. 9 may be repeated any number of times. Thus, in one non-limiting example, the historical rate at which data was received may be monitored (for example, at a plurality of points in time), and in response to an increase (or decrease) of the historical rate (which itself may fluctuate in time), data may be copied from the cache storage area 272 to the main storage area 274, or a process in which data is being copied from cache storage area 272 to the main storage area 274 may cease.

Reference is now made to FIG. 10. In step S511, the peripheral storage device 260 receives data from host device 310. In step S515, this data is stored in the cache storage area 272 of non-volatile memory 270. In step S519, a magnitude of an average time interval between successive host write requests sent form host 310 to peripheral storage device 260 during a historical time period preceding the receiving of data in step S511 is determined (see step S261 of FIG. 6).

In step S531, it is determined, in accordance with the magnitude of the average time interval, if data will be copied (i.e. at a particular time or in a particular time frame or at any time) from the cache storage area 272 to the main storage area 274. In one example: (i) in the event that the average time interval between successive write requests is relatively "large," it may be assumed that write commands will be received by peripheral device 260 from host 310 relatively "infrequently" in the near future and that device resources may be allocated to data copying from the cache storage area 272 to the main storage area 274; (ii) conversely, in the event the average time interval between successive write requests is relatively "small," it may be assumed that write commands will be received by peripheral device 260 from host 310 relatively "frequently" in the near future, that peripheral device 260 will be relatively "busy" in the near future, and that it is preferable to postpone copying of data from the cache storage area 272 to the main storage area.

In step S535, if step S523 yielded a "positive determining" (i.e. a determining that data will be copied from the cache storage area 272 to the main storage area 274), then data is copied from the cache storage area 272 to the main storage area 274 as determined.

It is noted that any of the step(s) of FIG. 10 may be repeated any number of times. Thus, in one non-limiting example, the average time interval between successive host write requests may be monitored (for example, at a plurality of points in time), and in response to an increase (or decrease) of the historical rate (which itself may fluctuate in time), data may be copied from the cache storage area 272 to the main storage area 274, or a process in which data is being copied from cache storage area 272 to the main storage area 274 may cease.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

"Non-volatile memory" refers to any kind of non-volatile memory including flash memory and magnetic memory.

"Incoming data" refers to data received by a flash memory device from a host that has not yet been stored in non-volatile memory (for example, flash memory) of the flash memory device. "Incoming data" may be temporarily stored (for example, by flash controller 280) in volatile memory 270 within the flash memory device.

In some embodiments (for example, some embodiments related to step S415 of FIG. 8B), an "extent to which the cache storage area 272 is full of previously-stored data" is determined. "Previously-stored data" refers to data stored in cache storage area 272 of non-volatile memory 270 before the time at which the "extent to which the flash memory storage device is full of previously-stored data" is determined.

ADDITIONAL REMARKS

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of implementing a caching policy for a non-volatile storage device that has a non-volatile memory including a cache storage area and a main storage area, the method comprising:
   a) receiving data by the non-volatile storage device from a host device coupled to the non-volatile storage device;
   b) determining by the non-volatile storage device whether to write the received data to the cache storage area of the non-volatile memory before writing the received data to the main storage area of the non-volatile memory in accordance with at least one parameter selected from the group consisting of:
      i) a historical rate at which other data was received by the non-volatile storage device from the host device during a time period preceding the receiving of the data of step (a); and
      ii) an average time interval between successive host write requests received during the preceding time period; and
   c) in the event of a positive determining, writing the data received in step (a) to the cache storage area as determined.

2. The method of claim 1 wherein the at least one parameter includes the historical rate at which the other data was received.

3. The method of claim 2 wherein the determining to write the received data to the cache storage area of the non-volatile memory before writing the data to the main storage area is contingent upon the historical rate being above a threshold level.

4. The method of claim 1 wherein the at least one parameter includes the average time interval between successive host write requests.

5. The method of claim 1 wherein the data-receiving is carried out before the determining.

6. The method of claim 1 wherein the determining is carried out before the data-receiving.

7. A method of implementing a caching policy for a non-volatile storage device that has a non-volatile memory including a cache storage area and a main storage area, the method comprising:
   a) receiving at least one request by the non-volatile storage device from a host device coupled to the non-volatile storage device to store data in the non-volatile memory;
   b) assessing a rate at which data is required to be written to the non-volatile memory in order to fulfill the at least one data storage request;
   c) in accordance with the assessed data-writing rate, determining whether to write the received data to the cache storage area of the non-volatile memory before writing the received data to the main storage area of the non-volatile memory; and
   d) in the event of a positive determining, writing the received data to the cache area as determined.

8. The method of claim 7 wherein:
   i) the receiving of the at least one request includes receiving a first request and a second request;
   ii) the rate assessing is carried out in accordance with:
      A) respective amounts of data of the first and second requests; and
      B) a time difference between a time of receiving the first request and a time of receiving the second request.

9. The method of claim 8 wherein:
   i) the receiving of the at least one request includes receiving a first request and a second request;
   ii) the rate assessing is carried out in accordance with a quotient between:
      A) the total amount of data of the first and second requests; and
      B) a time difference between a time of receiving the first request and a time of receiving the second request.

10. A method of implementing a caching policy for a non-volatile storage device that has a non-volatile memory including a cache storage area and a main storage area, the method comprising:
    a) receiving a request by the non-volatile storage device from a host device coupled to the non-volatile storage device to store data in the non-volatile memory;
    b) if the non-volatile storage device is in a store-to-cache-first mode at a time that the request is received, write the received data to the cache storage area of the non-volatile memory before writing the received data to the main storage area of the non-volatile memory;
    c) if the non-volatile storage device is in a bypass-cache mode at a time that the request is received, write the received data to the main storage area of the non-volatile memory without writing the received data to the cache storage area of the non-volatile memory; and
    d) effecting a mode transition, by the storage device, from the bypass-cache mode to the store-to-cache-first mode in response to a detected reading, by the host, of a storage ready/busy flag that returned a busy status.

11. The method of claim 10 further comprising:
    e) in accordance with a fullness of the cache storage area, deciding whether or not to transition from the store-to-cache-first mode to the bypass-cache mode; and
    f) effecting the transition from the store-to-cache-first mode to the bypass-cache mode as determined.

12. A method of implementing a cache flushing policy for a non-volatile storage device that has a non-volatile memory including a cache storage area and a main storage area, the method comprising:
    a) receiving data by the non-volatile storage device from a host device coupled to the non-volatile storage device;
    b) storing the received data in the cache storage area; and
    c) for at least one point in time:
       i) determining, by the non-volatile storage device, in accordance with at least one parameter selected from the group consisting of:
          A) a historical rate at which other data was received by the non-volatile storage device from the host device during a time period preceding the receiving of the data of step (a); and
          B) an average time interval between successive host write requests received during the preceding time period; and
          whether to copy the data received in step (a) from the cache storage area of the non-volatile memory to the main storage area of the non-volatile memory; and
       ii) in the event of a positive determining, copying the data received in step (a) from the cache storage area as determined.

13. The method of claim 12 wherein the at least one parameter includes the historical rate at which the other data was received.

14. The method of claim 12 wherein the at least one parameter includes the average time interval between successive host write requests.

* * * * *